(12) United States Patent
Lioy et al.

(10) Patent No.: US 6,370,118 B1
(45) Date of Patent: Apr. 9, 2002

(54) SIMULTANEOUS SET UP OF PPP ON AUM AND A RM INTERFACE

(75) Inventors: Marcello Lioy; Nischal Abrol, both of San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 0 days.

(21) Appl. No.: 09/256,118

(22) Filed: Feb. 24, 1999

(51) Int. Cl.[7] ............ G01R 31/08; H04Q 7/24; H04J 3/16
(52) U.S. Cl. ............ 370/235; 370/252; 370/338; 370/467
(58) Field of Search .................. 370/310, 328, 370/341, 338, 329, 231, 236, 252, 465–467, 469, 401, 410, 474, 235; 455/556, 557; 375/220, 133

(56) References Cited

U.S. PATENT DOCUMENTS

| | | | |
|---|---|---|---|
| 5,666,362 A | * 9/1997 | Chen et al. | 370/420 |
| 5,708,655 A | * 1/1998 | Toth et al. | 370/313 |
| 5,918,019 A | * 6/1999 | Valencia | 395/200.57 |
| 5,978,386 A | * 11/1999 | Hamalainen et al. | 370/466 |
| 6,057,943 A | * 5/2000 | Kweon et al. | 358/435 |
| 6,111,866 A | * 8/2000 | Kweon et al. | 370/355 |

FOREIGN PATENT DOCUMENTS

| | | | |
|---|---|---|---|
| EP | 0910198 | * 10/1998 | H04L/29/06 |
| WO | 9705726 | * 2/1997 | H04L/12/56 |

OTHER PUBLICATIONS

W. Simpson, "RFC Point–to–Point Protocol", Network Working Group, Jul. 1994, pp. 26–32.*

* cited by examiner

Primary Examiner—Alpus H. Hsu
Assistant Examiner—Duc Ho
(74) Attorney, Agent, or Firm—Philip Wadsworth; Charles Brown; Bruce Greenhaus (57) ABSTRACT

A method and a wireless communication device (MT2) for simultaneously negotiating LCP or IPCP configuration options over both the $R_m$ and the $U_m$ interfaces. When the MT2 device receives either an LCP or an IPCP Configure-Request packet over one of the $R_m$ or the $U_m$ interfaces, the MT2 device parses the requested configuration options and determines whether the requested options are supported by the MT2 device. If the requested options are supported, the MT2 device saves a Configure-Request ID, included in the Configure-Request packet, and frames the Configure-Request packet in a PPP frame for transmission on the other of the $R_m$ or the $U_m$ interfaces. If any of the requested configuration options are not supported by the MT2 device, the MT2 device creates a Configure-Reject packet, including the unsupported options, and frames the Configure-Reject packet in a PPP frame for transmission over the interface through which it received the Configure-Request packet.

12 Claims, 7 Drawing Sheets

SIMULTANEOUS SET UP OF PPP ON A $U_m$ AND A RM INTERFACE

BACKGROUND OF THE INVENTION

I. Field of the Invention

The present invention relates to the field of wireless data services. More particularly, the present invention relates to a novel and improved method and system for setting up a Point-to-Point Protocol (PPP) link between a terminal equipment (TE2) and a base station/mobile switching center (BS/MSC) interworking function (IWC) through a wireless communication device (MT2).

II. Description of Related Art

Internetworking, i.e., the connection of individual local area networks (LANs), has rapidly become very popular. The infrastructure and associated protocols commonly referred to as the "Internet" have become well known and widely used. A well known protocol for providing access to the Internet is the Point-to-Point Protocol (PPP) which provides a standard method for transporting multi-protocol datagrams over point-to-point links, and is further described in Request for Comment (RFC) 1661, W. Simpson, Editor, dated Jul. 1994, herein incorporated by reference.

PPP includes three main components:

1. a method of encapsulating multi-protocol datagrams;
2. a Link Control Protocol (LCP) for establishing, configuring, and testing a data link connection; and
3. a family of Network Control Protocols (NCPs) for establishing and configuring different network-layer protocols.

Figure 1:
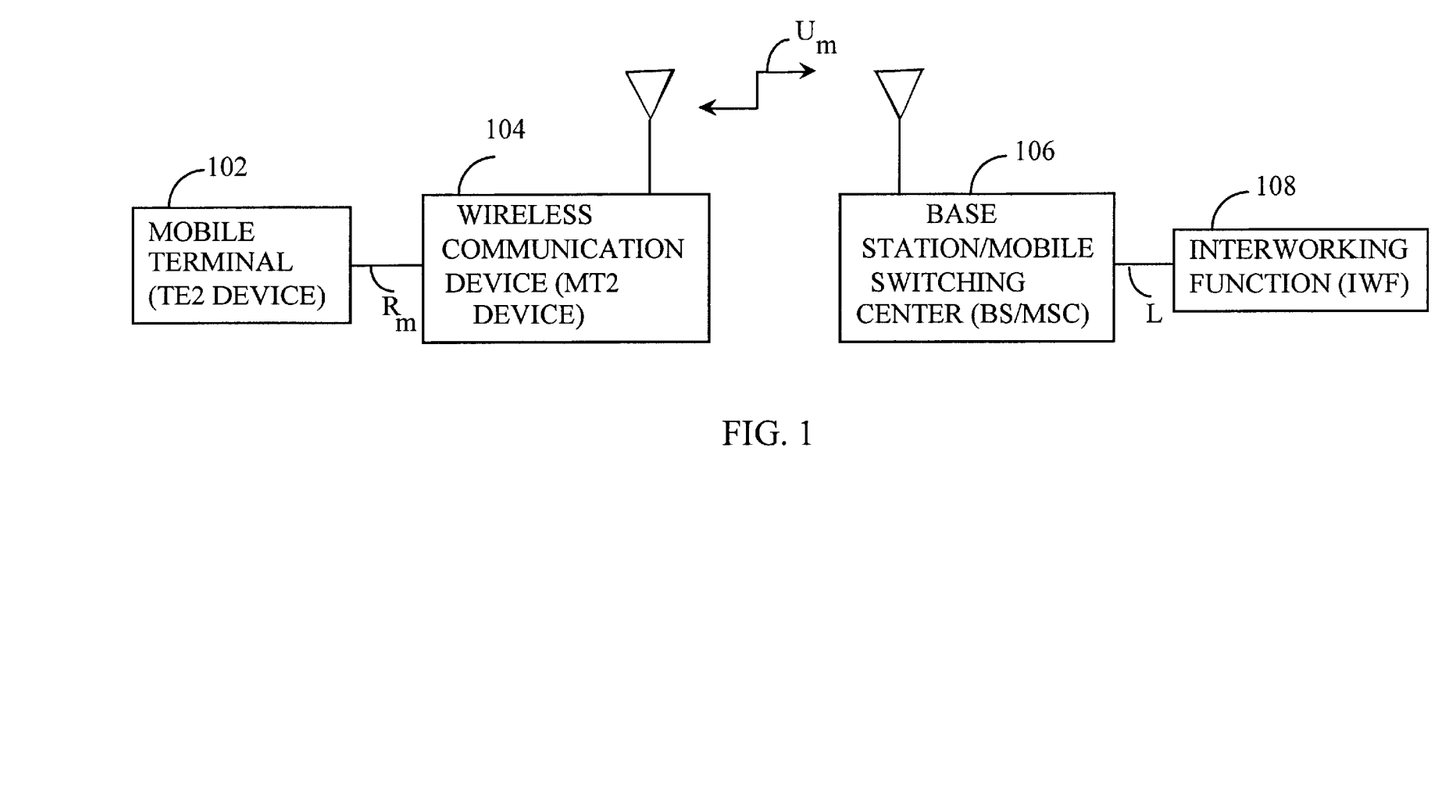
FIG. 1 illustrates a high-level block diagram of a wireless data communication device in which a terminal device connects to a network, such as the Internet, via a wireless communication device.

FIG. 1 illustrates a high-level block diagram of a wireless data communication system in which a mobile terminal (TE2 device) 102 communicates with an interworking function (IWF) 108 via a wireless communication system which includes a wireless communication device (MT2) 104 and Base Station/Mobile Switching Center (BS/MSC) 106. As used herein MT2 may refer to either a phone or a combination of a phone and a PCM CIA card. In FIG. 1, the IWF 108 serves as the access point to the Internet. IWF 108 is coupled to, and often co-located with BS/MSC 106, which may be a conventional wireless base station, as is known in the art. TE2 device 102 is coupled to MT2 device 104, which is in wireless communication with BS/MSC 106 and IWF 108.

Many protocols exist which allow data communication between the TE2 device 102 and the IWF 108. For example, Telecommunications Industry Association (TIA)/Electronics Industries Association (EIA) Interim Standard IS-707.5, entitled "Data Service Options for Wideband Spread Spectrum Systems: Packet Data Services," published February 1998, and herein incorporated by reference, defines requirements for support of packet data transmission capability on TIA/EIA IS-95 wideband spread spectrum systems, of which BS/MSC 106 and IWF 108 may be a part. IS-707.5 also provides the requirements for communication protocols on the links between the TE2 device 102 and the MT2 device 104 (the $R_m$ interface), between the MT2 device 104 and the BS/MSC 106 (the $U_m$ interface), and between the BS/MSC 106 and the IWF 108 (the L interface).

Figure 2:
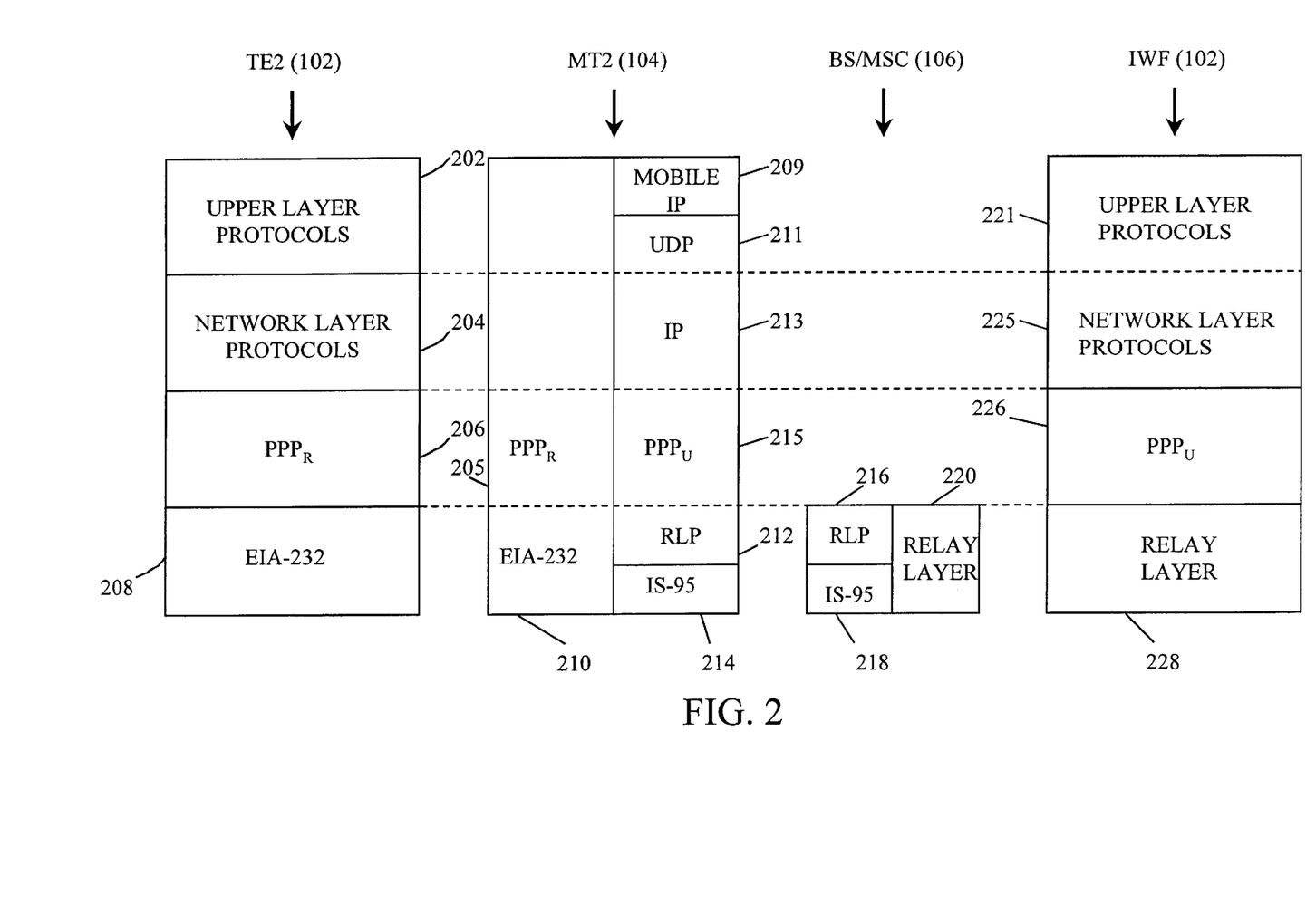
FIG. 2 is a diagram of the protocol stacks of each entity.

Referring now to FIG. 2, a diagram of the protocol stacks in each entity of the IS-707.5 Relay Model is shown. FIG. 2 corresponds roughly to Figure 1.4.2.2-1 of IS-707.5. At the far left of the figure is a protocol stack, shown in conventional vertical format, showing the protocol layers running on the TE2 device 102 (e.g., the mobile terminal, laptop or palmtop computer). The TE2 protocol stack is illustrated as being logically connected to the MT2 device 104 protocol stack over the $R_m$ interface. The MT2 device 104, is illustrated as being logically connected to the BS/MSC 106 protocol stack over the $U_m$ interface. The BS/MSC 106 protocol stack is, in turn, illustrated as being logically connected to the IWF 108 protocol stack over the L interface.

As an example of the operation of the protocols of FIG. 2, the Point to Point Protocol ($PPP_R$) protocol 206 encodes packets from the upper layer protocols 202,204 and transmits them across the $R_m$ interface using the EIA-232 protocol 208 to the EIA-232-compatible port on the MT2 device running the EIA-232 protocol 210. The EIA-232 protocol 210 on the MT2 device, receives the packets and passes them to the $PPP_R$ protocol 205. The $PPP_R$ protocol 205 unframes the packets encapsulated in PPP frames and typically, when a data connection is up, passes the packets to $PPP_U$ protocol 215, which frames the packets in PPP frames for transmission to a PPP peer located in the IWF (108). The Radio Link Protocol (RLP) 212 and IS-95 protocol 214, both of which are well known in the art, are used to transmit the packets, which are encapsulated in PPP frames, to the BS/MSC 106 over the $U_m$ interface. The RLP protocol 212 is defined in IS-707.2, entitled "Data Service Options for Wideband Spread Spectrum Systems: Radio Link Protocol", February 1998, herein incorporated by reference, and the IS-95 protocol is defined in IS-95 mentioned above. A complementary RLP protocol 216 and IS-95 protocol 218 in the BS/MSC 106 pass the packets to the relay layer protocol 220 for transmission across the L interface to relay layer protocol 228. $PPP_U$ protocol 226 then unframes the received packets and passes them to the network layer protocols 225, which will either pass them to upper layer protocols 221 or forward them on to the Internet.

As described in RFC 1661, the LCP Packets comprise a Configure-Request, a Configure-Ack, a Configure-Nak, and a Configure-Reject. The format of these packets is well known and described in RFC 1661.

The Configure-Request packet is used to negotiate configuration options. All configuration options are always negotiated simultaneously.

The Configuration-Ack packet is transmitted if every configuration option in a received Configuration-Request packet is recognizable and all values are acceptable.

The Configure-Nak packet is sent in response to a Configuration-Request packet when the requested configuration options are recognizable, but some of the values are not acceptable. The Options field of the Configure-Nak packet are filled only with the unacceptable configuration options from the Configure-Request packet. Note that all configuration options are always Nak'd simultaneously.

The Configure-Reject packet is sent when a received Configure-Request includes configuration options that are unrecognizable or are not acceptable for negotiation. The options field of the Configure-Reject contains only the unacceptable configuration options from the Configure-Request.

The following comprises the well-known configuration options, described in RFC 1661, and defined for the PPP LCP protocol:

1. Maximum-Receive-Unit
2. Authentication-Protocol
3. Quality-Protocol
4. Magic-Number
5. Protocol-Field-Compression 6. Address-and-Control-Field-Compression 7. ASYNC—Control Character $M_{RP}$ Internet Protocol Control Protocol (IPCP) is a network control protocol responsible for configuring, enabling, and disabling Internet Protocol (IP) modules on both ends of the PPP link. IPCP is described in Request for Comment (RFC) 1332, "The PPP Internet Protocol Control Protocol (CP)", G. McGregor Merit, May, 1992, herein incorporated by reference. IPCP configuration options include:

1. IP-Addresses;
2. IP-Compression-Protocol; and
3. IP-Address

IPCP uses the same option negotiation mechanism as the Link Control Protocol (LCP).

LCP and IPCP Configuration option negotiations occur separately for both the $R_m$ interface and the $U_m$ interface. That is, LCP or IPCP configuration option negotiation over one of the $R_m$ and $U_m$ interfaces is separate from LCP or IPCP configuration option negotiation over the other of the $R_m$ and $U_m$ interfaces. Therefore, the wireless communication device (MT2) must separately negotiate configuration options over the $R_m$ and $U_m$ interfaces. Separate configuration option negotiating by the MT2 over the $R_m$ and the $U_m$ interfaces causes the configuration option negotiation mechanism of the MT2 device to be unnecessarily complex and causes the configuration option negotiations on both interfaces to be unnecessarily long.

SUMMARY OF THE INVENTION

The present invention is a method and a wireless communication device (MT2) for simultaneously negotiating LCP or IPCP configuration options over both the $R_m$ and the $U_m$ interfaces.

When the MT2 device receives either an LCP or an IPCP Configure-Request packet over one of the $R_m$ and the $U_m$ interfaces, the MT2 device parses the requested configuration options and determines whether the requested options are supported by the MT2 device. If the requested options are supported, the MT2 device saves a Configure-Request ID, included in the Configure-Request packet, and frames the Configure-Request packet in a PPP frame for transmission on the other of the $R_m$ and the $U_m$ interfaces. If any of the requested configuration options are not supported by the MT2 device, the MT2 device creates a Configure-Reject packet, including the unsupported options, and frames the Configure-Reject packet in a PPP frame for transmission over the interface through which it received the Configure-Request packet, and the original request is discarded.

Thus, a simple and quick mechanism for simultaneously negotiatiating configuration options on both of the $R_m$ and the $U_m$ interfaces is provided.

BRIEF DESCRIPTION OF THE DRAWING

These and other advantages will become more apparent from the detailed description of the preferred embodiments along with the following drawings.

DETAILED DESCRIPTION OF THE PREFERRED EMBODIMENTS

As is known in the art, in order to establish communications over a point-to-point link, Link Control Protocol (LCP) packets for establishing, configuring and testing the data link connection must be exchanged over each PPP link, i.e., the $R_m$ and $U_m$ interfaces. Any options not negotiated use a predefined default value, as specified by RFC 1661.

Similarly, IPCP packets for negotiating and configuring IPCP configuration options must be exchanged over the $R_m$ and $U_m$ interfaces. Any options not negotiated use a predefined default value, as specified by RFC 1332.

As described in RFC 1661, the LCP Packets comprise a Configure-Request, a Configure-Ack, a Configure-Nak, and a Configure-Reject. The format of these packets is well known and described in RFC 1661.

Because the mechanism for negotiating IPCP configuration options is identical to the mechanism for negotiating LCP configuration options, the following detailed description applies to both LCP and IPCP.

In a conventional system, configuration option negotiations occur separately for both the $R_m$ interface and the $U_m$ interface. As described in RFC 1661 and RFC 1332, the Configure-Request packet contains a list of the options being requested and the Configuration-Ack packet contains a list of the options which the sender is acknowledging.

Figure 3:
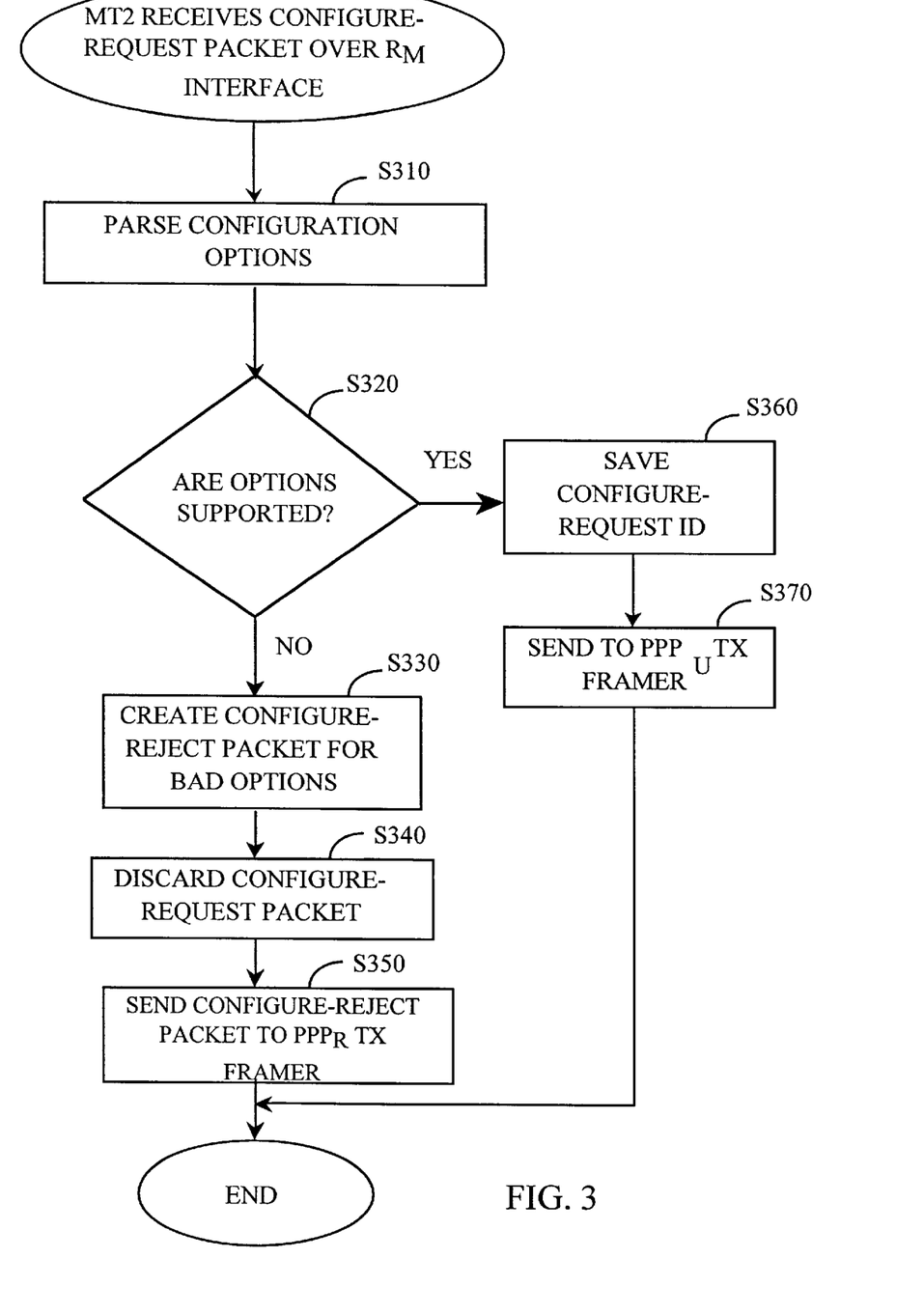
FIG. 3 is a flowchart showing the processing that occurs when the MT2 device receives a Configure-Request packet over the $R_m$ interface.

FIG. 3 explains the processing which occurs when a LCP or a IPCP Configure-Request packet is received by the MT2 device over the $R_m$ interface. Step S310 is performed to parse the configuration options requested in the Configure-Request packet. In step S320, each of the options are checked to determine whether they are supported by the MT2 device.

If any of the options are not supported, step S330 is performed to create a Configure-Reject packet for the bad options. In step S340, the Configure-Request packet is discarded. In step S350, the Configure-Reject packet is sent to the PPP framer for the $R_m$ interface, which will subsequently cause the Configure-Reject packet to be encapsulated in a PPP frame for transmission over the $R_m$ interface.

If step S320 determines that all of the requested options are supported by the MT2 device, then step S360 is performed to save a Configure-Request ID, included in the Configure-Request packet. Step S370 is then performed to pass the Configure-Request packet to the PPP framer for encapsulation in a PPP frame for transmission over the $U_m$ interface.

Figure 4:
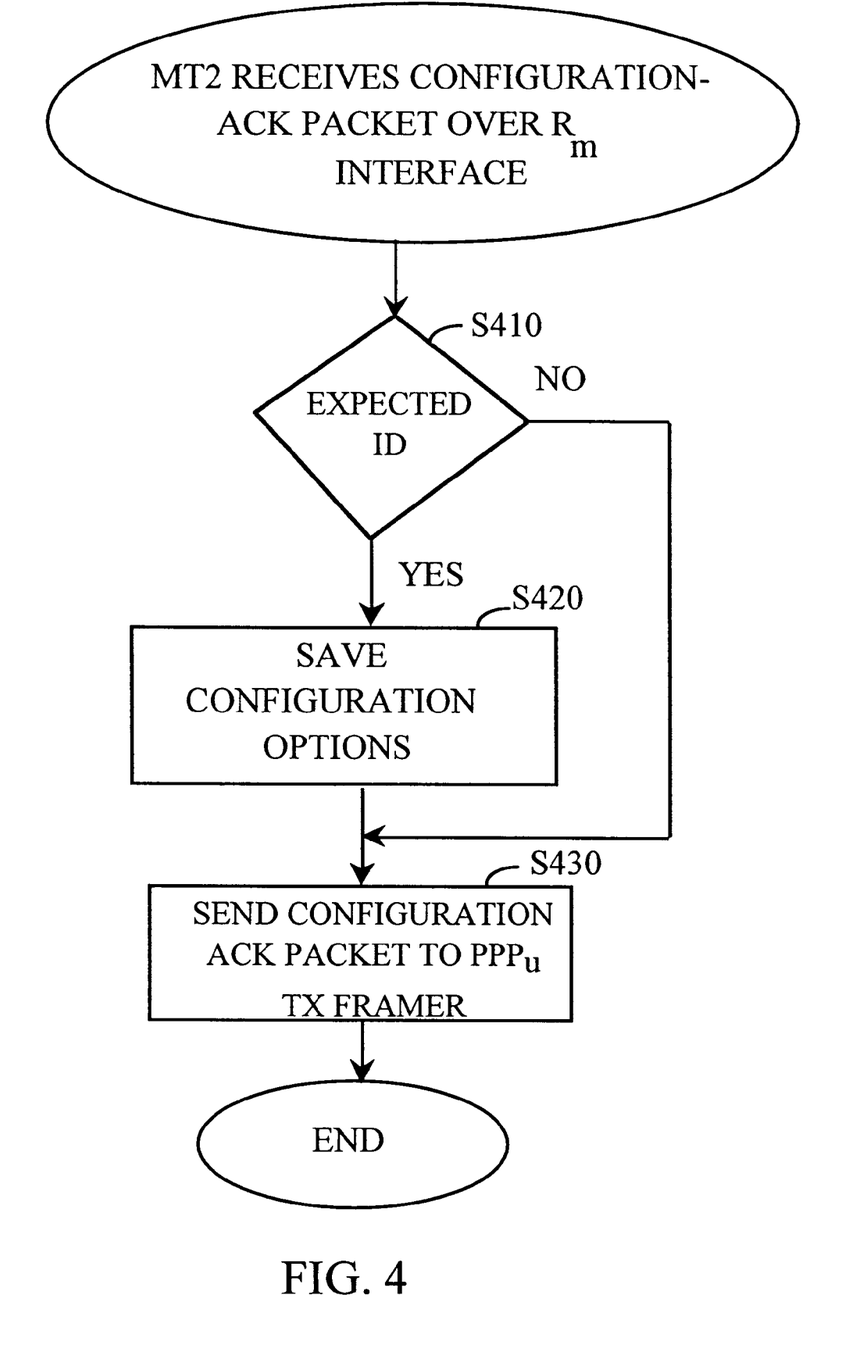
FIG. 4 is a flowchart showing the processing that occurs when the MT2 device receives a Configuration-Ack packet over the $R_m$ interface.

FIG. 4 explains the processing which occurs when a Configuration-Ack packet is received by the MT2 device over the $R_m$ interface. In step S410, an ID in the Configuration-Ack packet is compared to the Configure-Request ID. If the IDs match, then step S420 is performed to save the configuration options included in the Configuration-Ack packet. Step S430 is performed to pass the Configuration-Ack packet to the PPP framer for the $U_m$ interface, which will subsequently cause the Configuration- Ack packet to be encapsulated in a PPP frame and transmitted over the $U_m$ interface.

If step S410 determines that the ID in the Configuration-Ack packet does not match the Configure-Request ID, then step S430 is performed to pass the Configuration-Ack packet to the PPP framer for the $U_m$ interface, which will subsequently cause the Configuration-Ack packet to be encapsulated in a PPP frame and transmitted over the $U_m$ interface. In other words, the configuration options are not saved when the ID in the Configuration-Ack packet does not match the Configure-Request ID.

Figure 5:
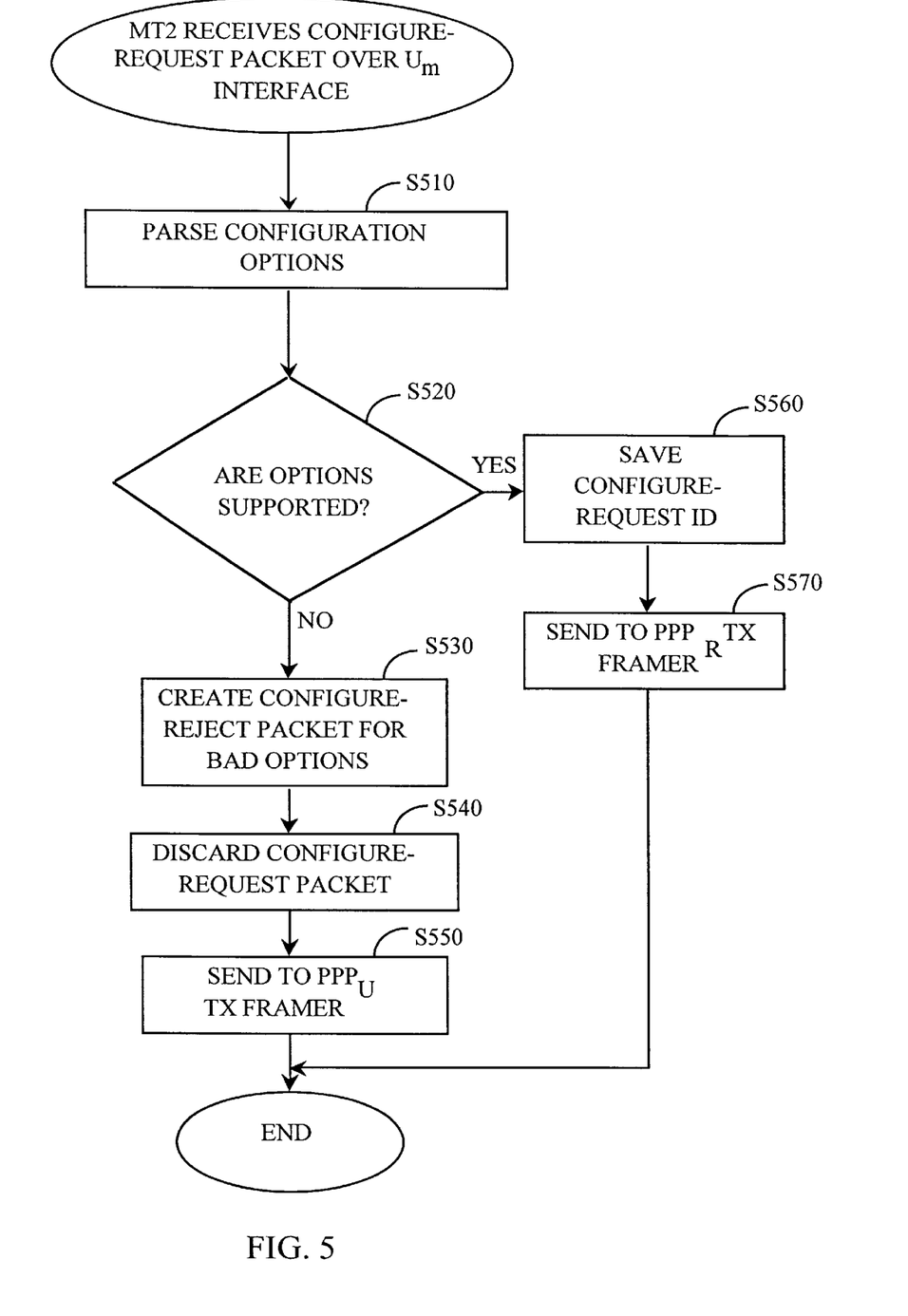
FIG. 5 is a flowchart showing the processing that occurs when the MT2 device receives a Configure-Request packet over the $U_m$ interface.

FIG. 5 shows the processing that is performed when a Configure-Request packet is received over the $U_m$ interface. FIG. 5 is analogous to FIG. 3, which shows the processing which occurs when a Configure-Request packet is received over the $R_m$ interface. Step S510 is performed to parse the configuration options requested in the Configure-Request packet. In step S520, each of the options is checked to determine whether it is supported by the MT2 device.

If any of the options are not supported, step S530 is performed to create a Configure-Reject packet for the bad options. In step S540, the Configure-Request packet is discarded. In step S550, the Configure-Reject packet is sent to the PPP framer for the $R_m$ interface, which will encapsulate the packet in a PPP frame for transmission on the $R_m$ interface.

If step S520 determines that all of the requested options are supported by the MT2 device, then step S560 is performed to save a Configure-Request ID, included in the Configure-Request packet. Step S570 is then performed to pass the Configure-Request packet to the PPP framer for the $U_m$ interface, which encapsulates the packet in a PPP frame for transmission over the $U_m$ interface.

Figure 6:
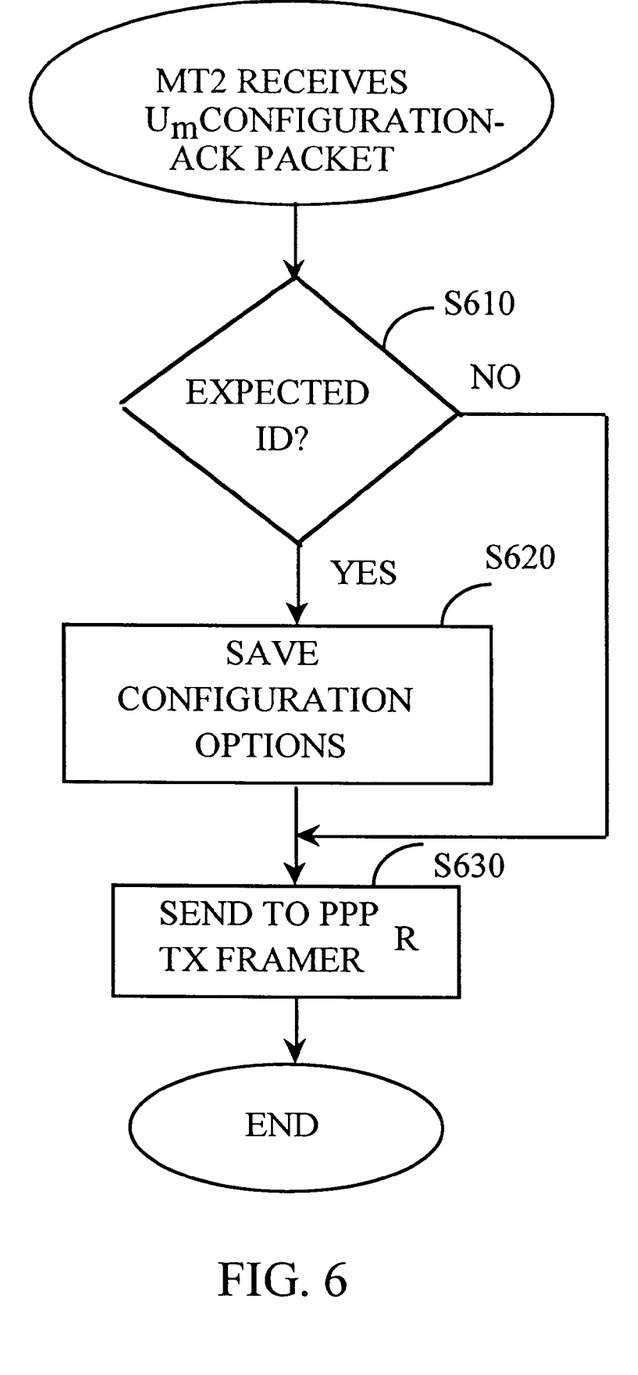
FIG. 6 is a flowchart showing the processing that occurs when the MT2 device receives a Configuration-Ack packet over the $U_m$ interface.

FIG. 6 shows the processing which occurs when a Configuration-Ack packet is received over the $U_m$ interface. FIG. 6 is analogous to FIG. 4 which shows the processing which occurs when a Configuration-Ack packet is received over the $R_m$ interface. In step S610, an ID in the Configuration-Ack packet is compared to the Configure-Request ID. If the IDs match, then step S620 is performed to save the configuration options included in the Configuration-Ack packet. Step S630 is performed to pass the Configuration-Ack packet to the PPP framer for the $U_m$ interface, which will subsequently cause the Configuration-Ack packet to be encapsulated in a PPP frame and transmitted over the $R_m$ interface.

If step S610 determines that the ID in the Configuration-Ack packet does not match the Configure-Request ID, then step S630 is performed to pass the Configuration-Ack packet to the PPP framer for the $R_m$ interface, which will subsequently cause the Configuration-Ack packet to be encapsulated in a PPP frame and transmitted over the $R_m$ interface. In other words, the configuration options are not saved when the ID in the Configuration-Ack packet does not match the Configure-Request ID.

Any other configuration negotiation packets received on one of the $R_m$ and the $U_m$ interfaces will be passed through the MT2 device and transmitted on the other of the $R_m$ and the $U_m$ interfaces.

Figure 7:
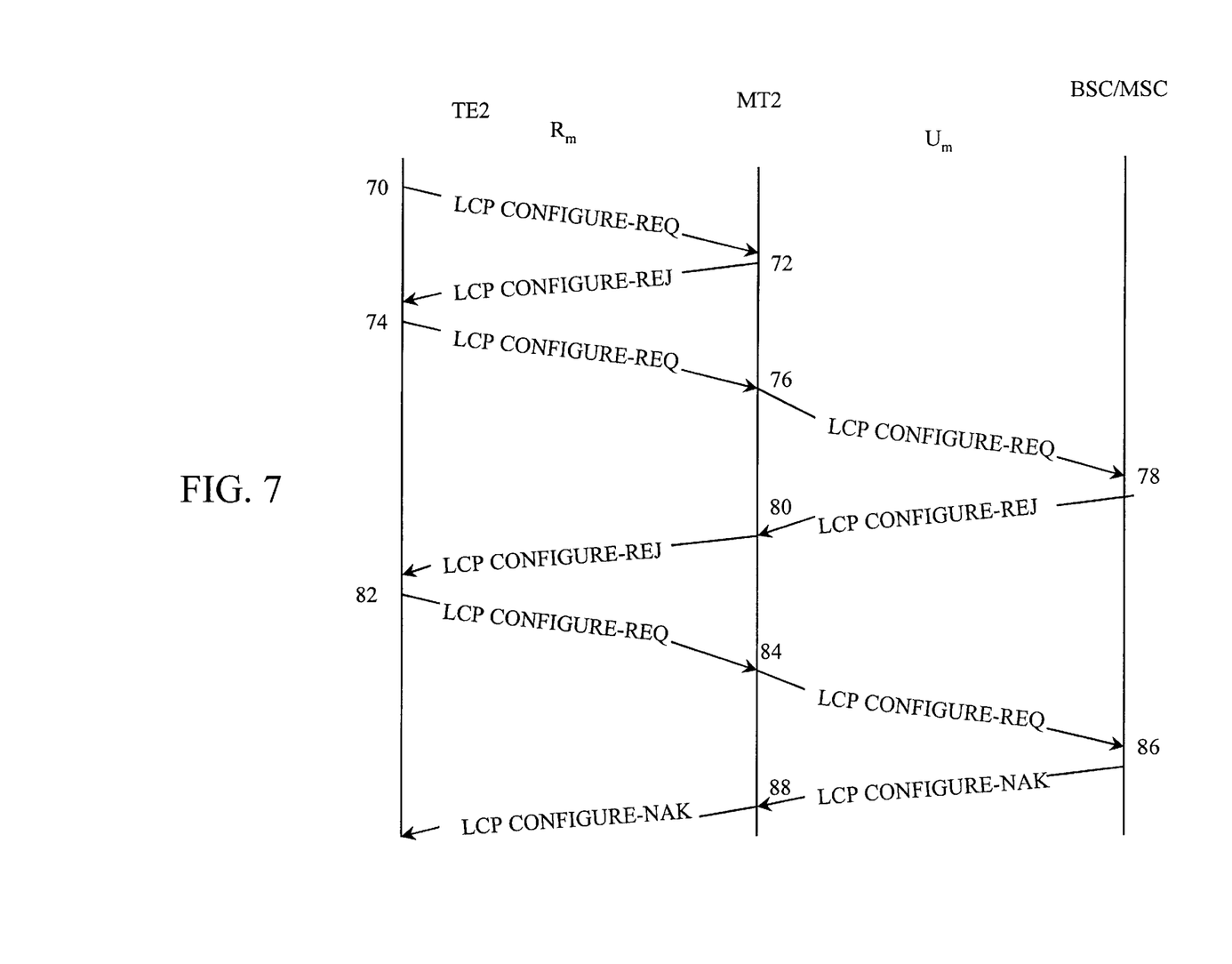
FIG. 7 shows examples of LCP configuration negotiations.

FIG. 7 shows examples of LCP configuration negotiations. At 70, the TE2 device sends a LCP Configure-Request packet over the $R_m$ interface to the MT2 device. At 72, the MT2 receives the LCP Configure-Request packet, determines that the MT2 device does not support all the requested configuration options of the LCP Configure-Request packet and generates and sends a LCP Configure-Reject packet, indicating the bad options, over the $R_m$ interface.

At 74, the TE2 generates a LCP Configure-Request packet over the $R_m$ interface. At 76, the MT2 device receives the LCP Configure-Request packet, parses the configuration options, determines that the configuration options are supported by the MT2 device, saves the Configure-Request ID from the LCP Configure-Request packet, frames the LCP Configure-Request packet in a PPP frame and transmits the PPP frame over the $U_m$ interface. At 78, the IWF analyzes the LCP Configure-Request packet, determines that some of the requested options are bad, and sends a LCP Configure-Reject packet, including the bad options to the MT2 device over the $U_m$ interface. At 80, the MT2 device receives the LCP Configure-Reject packet, determines that the received packet is neither a LCP Configure-Request packet nor a LCP Configuration-Ack packet and the MT2 device transmits the LCP Configure-Reject packet over the A, interface to the TE2 device.

At 82, the TE2 device generates a LCP Configure Request packet over the $R_m$ interface to the MT2 device. At 84, the MT2 device parses the configuration options included in the LCP Configure-Request packet, determines that the MT2 device supports all configuration options, encapsulates the LCP Configure-Request packet in a PPP frame, and transmits the PPP frame over the $U_m$ interface to the IWF. At 86, the IWF determines that it would prefer to negotiate other values of the requested options and the IWF generates and transmits a LCP Configure-Nak packet indicating the desired option values. At 88, the MT2 receives the LCP Configure-Nak, determines that the received packet is neither a LCP Configure-Request packet nor a LCP Configuration-Ack packet and the MT2 device transmits the LCP Configure-Nak, encapsulated in a PPP frame, over the $R_m$ interface to the TE2 device.

The above examples of FIG. 7 use the PPP LCP protocol, however, the IPCP protocol may also be used because the configuration negotiation mechanism is identical to the LCP protocol. For example, a IPCP Configure-Request may be used in place of a LCP Configure-Request; a IPCP Configure-Reject may be used in place of a LCP Configure-Reject; a IPCP Configure-Nak may be used in place of a LCP Configure-Nak, . . . , etc.

One of ordinary skill in the art would also understand that any of the above mentioned LCP or IPCP configuration negotiation packets may be transmitted from either the $R_m$ interface or the $U_m$ interface.

While this invention has been described in connection with what is presently considered to be the preferred embodiment, it is to be understood that the invention is not limited to the disclosed embodiment, but on the contrary, is intended to cover various modifications and equivalent arrangements included within the spirit and scope of the appended claims.

We claim as our invention:

1. A method of simultaneously establishing a PPP link between a wireless communication device and an interworking function (IWF) on a $U_m$ interface, and between said wireless communication device and a TE2 device over a $R_m$ interface, said method comprising:

receiving, in said wireless communication device, a Configure-Request packet over said $R_m$ interface;

determining whether all configuration options included in said Configure-Request packet are supported by said wireless communication device;

creating and sending a Configure-Reject packet when said determining determines that at least one of said configuration options included in said Configure-Request packet is not supported by said wireless communication device;

framing said Configure-Request packet in a PPP frame and transmitting said PPP frame over said $U_m$ interface, when said determining determines that all of said configuration options in said Configuration Request packet are supported;

storing, in a memory, a Configure-Request ID, included in said Configure-Request packet, when said determining determines that all of said configuration options in said Configure-Request packet are supported receiving a Configuration-Ack packet over said $U_m$ interface;

framing said Configuration-Ack packet in said PPP frame and sending said PPP frame including said Configuration-Ack packet over said $R_m$ interface;

receiving a Configuration-Ack packet over said $R_m$ interface;

framing said Configuration-Ack packet in said PPP frame; and sending said PPP frame including said Configuration-Ack packet over said $U_m$ interface.

2. A method according to claim 1, further comprising:

determining whether an ID included in said Configuration-Ack packet matches said Configure-Request ID stored in said memory; and saving values of all options included in said Configuration-Ack packet when said determining determines that said ID in said Configuration-Ack packet matches said Configure-Request ID stored in said memory.

3. A method of simultaneously establishing a PPP link between a wireless communication device and an interworking function (IWF) on a $U_m$ interface, and between said wireless communication device and a TE2 device over a $R_m$ interface, said method comprising:

receiving, in said wireless communication device, a Configure-Request packet over said $R_m$ interface;

determining whether all configuration options included in said Configure-Request packet are supported by said wireless communication device;

creating and sending a Configure-Reject packet when said determining determines that at least one of said configuration options included in said Configure-Request packet is not supported by said wireless communication device;

storing, in a memory, a Configure-Request ID, included in said Configure-Request packet, when said determining determines that all of said configuration options in said Configure-Request packet are supported;

framing said Configure-Request packet in a PPP frame and transmitting said PPP frame over said $U_m$ interface, when said determining determines that all of said configuration options in said Configuration Request packet are supported;

receiving a Configuration-Ack packet over said $U_m$ interface;

determining whether an ID included in said Configuration-Ack packet matches said Configure-Request ID stored in said memory;

saving values of all options included in said Configuration-Ack packet when said determining determines that said ID in said Configuration-Ack packet matches said Configure-Request ID stored in said memory; and framing said Configuration-Ack packet in said PPP frame and sending said PPP frame including said Configuration-Ack packet over said $R_m$ interface.

4. A method of simultaneously establishing a PPP link between a wireless communication device and an interworking function (IWC) on a $U_m$ interface, and between said wireless communication device and a TE2 device over a $R_m$ interface, said method comprising:

receiving, in said wireless communication device, a Configure-Request packet over said $U_m$ interface;

determining whether all configuration options included in said Configure-Request packet are supported by said wireless communication device;

creating and sending a Configure-Reject packet when said determining determines that at least one of said configuration options included in said Configure-Request packet is not supported by said wireless communication device;

framing said Configure-Request packet in a PPP frame and transmitting said PPP frame over said $R_m$ interface, when said determining determines that all of said configuration options in said Configuration Request packet are supported storing, in a memory, a Configure-Request ID, included in said Configure-Request packet, when said determining determines that all of said configuration options in said Configure-Request packet are supported receiving a Configuration-Ack packet over said $R_m$ interface;

framing said Configuration-Ack packet in said PPP frame; and sending said PPP frame including said Configuration-Ack packet over said $U_m$ interface.

5. A method of simultaneously establishing a PPP link between a wireless communication device and an interworking function (IWC) on a $U_m$ interface, and between said wireless communication device and a TE2 device over a $R_m$ interface, said method comprising:

receiving, in said wireless communication device, a Configure-Request packet over said $U_m$ interface;

determining whether all configuration options included in said Configure-Request packet are supported by said wireless communication device;

creating and sending a Configure-Reject packet when said determining determines that at least one of said configuration options included in said Configure-Request packet is not supported by said wireless communication device;

framing said Configure-Request packet in a PPP frame and transmitting said PPP frame over said $R_m$ interface, when said determining determines that all of said configuration options in said Configuration Request packet are supported;

storing, in a memory, a Configure-Request ID, included in said Configure-Request packet, when said determining determines that all of said configuration options in said Configure-Request packet are supported receiving a Configuration-Ack packet over said $R_m$ interface;

framing said Configuration-Ack packet in said PPP frame; and sending said PPP frame including said Configuration-Ack packet over said $U_m$ interface.

6. A method according to claim 5, further comprising:

determining whether an ID included in said Configuration-Ack packet matches said Configure-Request ID; and saving values of all options included in said Configuration-Ack packet when said determining determines that said ID in said Configuration-Ack packet matches said Configure-Request ID stored in said memory.

7. A method of simultaneously establishing a PPP link between a wireless communication device and an interworking function (IWC) on a $U_m$ interface, and between said wireless communication device and a TE2 device over a $R_m$ interface, said method comprising:

receiving, in said wireless communication device, a Configure-Request packet over said $U_m$ interface;

determining whether all configuration options included in said Configure-Request packet are supported by said wireless communication device;

creating and sending a Configure-Reject packet when said determining determines that at least one of said configuration options included in said Configure-Request packet is not supported by said wireless communication device;

storing, in a memory, a Configure-Request ID, included in said Configure-Request packet, when said determining determines that all of said configuration options in said Configure-Request packet are supported;

framing said Configure-Request packet in a PPP frame and transmitting said PPP frame over said $R_m$ interface, when said determining determines that all of said configuration options in said Configuration Request packet are supported;

receiving a Configuration-Ack packet over said $R_m$ interface;

determining whether an ID included in said Configuration-Ack packet matches said Configure-Request ID stored in said memory;

saving values of all options included in said Configuration-Ack packet when said determining determines that said ID in said Configuration-Ack packet matches said Configure-Request ID stored in said memory; and framing said Configuration-Ack packet in said PPP frame and sending said PPP frame including said Configuration-Ack packet over said $U_m$ interface.

8. A wireless communication device capable of simultaneously establishing a PPP link to an interworking function (IWC) on a $U_m$ interface, and to a TE2 device over a $R_m$ interface, said wireless communication device comprising:

means for receiving a Configure-Request packet over said $R_m$ interface;

means for determining whether all configuration options included in said Configure-Request packet are supported by said wireless communication device;

means for creating and for sending a Configure-Reject packet when said determining means determines that at least one of said configuration options included in said Configure-Request packet is not supported by said wireless communication device;

means for framing said Configure-Request packet in a PPP frame and for transmitting said PPP frame over said $U_m$ interface, when said determining means determines that all of said configuration options in said Configuration Request packet are supported means for storing, in a memory, a Configure-Request ID, included in said Configure-Request packet, when said determining means determines that all of said configuration options in said Configure-Request packet are supported means for receiving a Configuration-Ack packet over said $U_m$ interface;

means for framing said Configuration-Ack packet in said PPP frame and for sending said PPP frame including said Configuration-Ack packet over said $R_m$ interface;

means for receiving a Configuration-Ack packet over said $U_m$ interface;

means for framing said Configuration-Ack packet in said PPP frame and for sending said PPP frame including said Configuration-Ack packet over said $R_m$ interface;

means for determining whether an ID included in said Configuration-Ack packet matches said Configure-Request ID stored in said memory; and means for saving values of all options included in said Configuration-Ack packet when said determining determines that said ID in said Configuration-Ack packet matches said Configure-Request ID stored in said memory.

9. A wireless communication device capable of simultaneously establishing a PPP link to an interworking function (IWC) on a $U_m$ interface, and to a TE2 device over a $R_m$ interface, said wireless communication device comprising:

means for receiving a Configure-Request packet over said $R_m$ interface;

means for determining whether all configuration options included in said Configure-Request packet are supported by said wireless communication device;

means for creating and for sending a Configure-Reject packet when said determining means determines that at least one of said configuration options included in said Configure-Request packet is not supported by said wireless communication device;

means for storing, in a memory, a Configure-Request ID, included in said Configure-Request packet, when said determining means determines that all of said configuration options in said Configure-Request packet are supported;

means for framing said Configure-Request packet in a PPP frame and for transmitting said PPP frame over said $U_m$ interface, when said determining means determines that all of said configuration options in said Configuration Request packet are supported;

means for receiving a Configuration-Ack packet over said $U_m$ interface;

means for determining whether an ID included in said Configuration-Ack packet matches said Configure-Request ID stored in said memory;

means for saving values of all options included in said Configuration-Ack packet when said determining determines that said ID in said Configuration-Ack packet matches said Configure-Request ID stored in said memory; and means for framing said Configuration-Ack packet in said PPP frame and for sending said PPP frame including said Configuration-Ack packet over said $R_m$ interface.

10. A wireless communication device capable of simultaneously establishing a PPP link an interworking function (IWC) on a $U_m$ interface, and to a TE2 device over a $R_m$ interface, said wireless communication device comprising:

means for receiving a Configure-Request packet over said $U_m$ interface;

means for determining whether all configuration options included in said Configure-Request packet are supported by said wireless communication device;

means for creating and for sending a Configure-Reject packet when said determining means determines that at least one of said configuration options included in said Configure-Request packet is not supported by said wireless communication device;

means for framing said Configure-Request packet in a PPP frame and for transmitting said PPP frame over said $R_m$ interface, when said determining determines that all of said configuration options in said Configuration Request packet are supported;

means for storing, in a memory, a Configure-Request ID, included in said Configure-Request packet, when said determining means determines that all of said configuration options in said Configure-Request packet are supported;

means for receiving a Configuration-Ack packet over said $R_m$ interface; and means for framing said Configuration-Ack packet in said PPP frame and for sending said PPP frame including said Configuration-Ack packet over said $U_m$ interface.

11. A wireless communication device capable of simultaneously establishing a PPP link an interworking function (IWC) on a $U_m$ interface, and to a TE2 device over a $R_m$ interface, said wireless communication device comprising:

means for receiving a Configure-Request packet over said $U_m$ interface;

means for determining whether all configuration options included in said Configure-Request packet are supported by said wireless communication device;

means for creating and for sending a Configure-Reject packet when said determining means determines that at least one of said configuration options included in said Configure-Request packet is not supported by said wireless communication device;

means for framing said Configure-Request packet in a PPP frame and for transmitting said PPP frame over said $R_m$ interface, when said determining determines that all of said configuration options in said Configuration Request packet are supported;

means for storing, in a memory, a Configure-Request ID, included in said Configure-Request packet, when said determining means determines that all of said configuration options in said Configure-Request packet are supported;

means for receiving a Configuration-Ack packet over said $U_m$ interface;

means for framing said Configuration-Ack packet in said PPP frame and for sending said PPP frame including said Configuration-Ack packet over said $R_m$ interface;

means for determining whether an ID included in said Configuration-Ack packet matches said Configure-Request ID stored in said memory; and means for saving values of all options included in said Configuration-Ack packet when said determining means determines that said ID in said Configuration-Ack packet matches said Configure-Request ID stored in said memory.

12. A wireless communication device capable of simultaneously establishing a PPP link to an interworking function (IWC) on a $U_m$ interface, and to a TE2 device over a $R_m$ interface, said wireless communication device comprising:

means for receiving a Configure-Request packet over said $U_m$ interface;

means for determining whether all configuration options included in said Configure-Request packet are supported by said wireless communication device;

means for creating and for sending a Configure-Reject packet when said determining means determines that at least one of said configuration options included in said Configure-Request packet is not supported by said wireless communication device;

means for storing, in a memory, a Configure-Request ID, included in said Configure-Request packet, when said determining means determines that all of said configuration options in said Configure-Request packet are supported;

means for framing said Configure-Request packet in a PPP frame and for transmitting said PPP frame over said $R_m$ interface, when said determining means determines that all of said configuration options in said Configuration Request packet are supported;

means for receiving a Configuration-Ack packet over said $R_m$ interface;

means for determining whether an ID included in said Configuration-Ack packet matches said Configure-Request ID stored in said memory;

means for saving values of all options included in said Configuration-Ack packet when said determining means determines that said ID in said Configuration-Ack packet matches said Configure-Request ID stored in said memory; and means for framing said Configuration-Ack packet in said PPP frame and for sending said PPP frame including said Configuration-Ack packet over said $U_m$ interface.

* * * * *

UNITED STATES PATENT AND TRADEMARK OFFICE
CERTIFICATE OF CORRECTION

PATENT NO. : 6,370,118 B1
APPLICATION NO. : 09/256118
DATED : April 9, 2002
INVENTOR(S) : Marcello Lioy and Nischal Abrol

It is certified that error appears in the above-identified patent and that said Letters Patent is hereby corrected as shown below:

The Title should read:

Simultaneous Set Up of PPP on a $U_m$ and a $R_m$ Interface

Signed and Sealed this

Twenty-second Day of May, 2007

JON W. DUDAS
*Director of the United States Patent and Trademark Office*